June 27, 1944.    J. J. SEME    2,352,348

CHAMFERING TOOL

Filed March 19, 1943

INVENTOR.
JOHN J. SEME
BY
Frank N. Harmon
ATTORNEY

Patented June 27, 1944

2,352,348

UNITED STATES PATENT OFFICE 2,352,348

CHAMFERING TOOL

John J. Seme, Maple Heights, Ohio, assignor to Jack & Heintz, Inc., Bedford, Ohio, a corporation of Ohio Application March 19, 1943, Serial No. 479,761

2 Claims. (Cl. 77—73.5)

This invention relates in general to cutting tools and more particularly to an improved chamfering tool for chamfering both ends of holes cut in cylindrical objects and has for its primary object to provide a tool that will automatically compensate for the cylindrical surface and so regulate the movement of the cutting tool that the chamfer of the hole will be uniform.

With the foregoing and other objects in view, the invention resides in the combination of parts and in the details of construction hereinafter set forth in the following specification and appended claims, certain embodiments thereof being illustrated in the accompanying drawing, in which:

Figure 1:
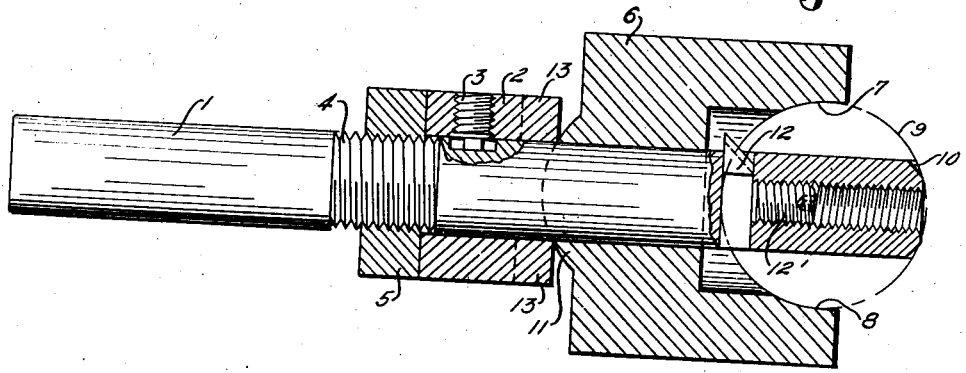
Figure 1 is a view in longitudinal section taken through the chamfering tool, showing the work in cross section, and showing the tool fully home in the hole.
Figure 2:
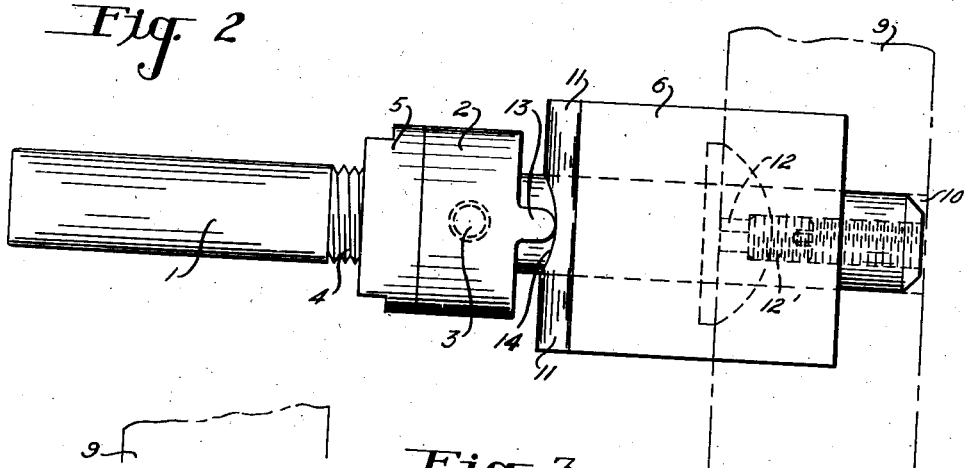
Figure 2 is a view at right angles to Figure 1.
Figure 3:
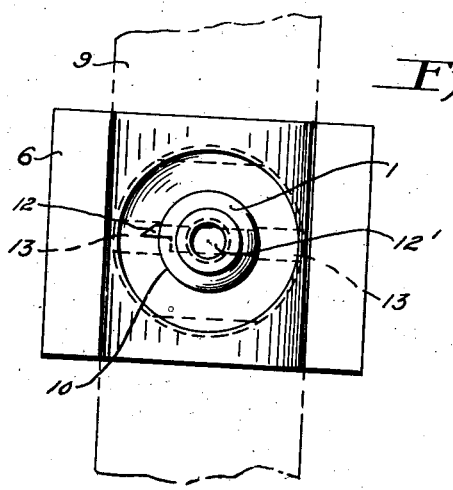
Figure 3 is a bottom plan view of the work and tool.

Referring more particularly to the drawing, the chamfering tool may comprise a cylindrical or solid rod 1 which slidably receives a collar 2 secured thereto by a set screw 3. The rod is also provided with screw threads 4 to receive a lock nut 5 to maintain the collar in proper adjusted position.

It will be appreciated that in chamfering a hole in a flat surface the cutting edge of the chamfering tool may rotate in a flat circular plane. However, in chamfering a hole in a cylindrical surface the curvature of the surface of the work must be compensated for in order to obtain an equal and uniform chamber. Therefore, the tool also includes a body 6 which fits slidably about the rod 1 and which has its inner surfaces 7 and 8 formed to fit the radius of the work 9 and the rod passes through the hole 10 in the work.

The sliding body 6 is also provided with a cam lift 11 the curvature radius of which is equal to that of the radius of the work. The rod has embedded therein a cutting tool 12, held in place by a screw 12' the cutting edge of which tool protrudes therethrough to contact and chamfer the surface of the work surrounding the hole extending therethrough. This cutting tool serves also as a limiting stop for the sliding of the body 6 in one direction on the rod. The collar 2 is provided with two diametrically opposed cams 13 which engage and ride on the two cam lifts 11 and the two surfaces 14 therebetween.

Thus, it will be seen that when pressure is applied on the work and a rotating force is applied to the rod while the body 6 engages the work and the rod extends through the hole, the cutting edge of the tool is in a position to chamfer the edges of the hole and furthermore the cam action of the cams 13 with the cam lifts 11 causes a reciprocation of the rod. This automatically adjusts the relationship between the cutting edge and the edges of the hole to vary the cutting effect of the cutting edge. By reason of the fact that the radius of the cam lifts is equal to that of the radius of the work, the reciprocation of the rod and the consequent automatic adjustment of the angle of the tool cutting edge is such as to bring about an equal and uniform chamfering of the edges of the holes in the work, despite the curved surface of the latter. It will also be seen that by the provision of this simple automatic tool both ends of the holes may be chamfered in the same manner and that in operating on work of the same size the operation being simple makes the assembly lend itself readily to increased output and mass production.

I claim:

1. A device for chamfering the holes in work having curved surfaces, a rod extending through said hole and carrying an adjustable cutting edge adapted to engage said work adjacent the edges of said hole, means for automatically compensating for the curvature of the surface of said work and adjusting the cutting effect of said cutting edge as said rod rotates so as to effect an equal and uniform chamfering of the edges of said hole, said means comprising a forked body slidably arranged on said rod and adapted to grip the curved surface of the work, cam means for predeterminedly reciprocating said rod as the latter rotates, said cam means including a pair of cam lifts formed on said body, a collar secured to said rod and having a pair of cams adapted to be engaged by the cam lifts on said body so as to reciprocate said rod upon rotation thereof.

2. A device for chamfering the holes in work having curved surfaces, a rod extending through said hole and carrying an adjustable cutting edge adapted to engage said work adjacent the edges of said hole, means for automatically compensating for the curvature of the surface of said work and adjusting the cutting effect of said cutting edge as said rod rotates so as to effect an equal and uniform chamfering of the edges of said hole, said means comprising a forked body slidably arranged on said rod and adapted to grip the curved surface of said work, cam means for predeterminedly reciprocating said rod as the latter rotates, said cam means including a pair of cam lifts formed on said body, a collar secured to said rod and having a pair of cams adapted to be engaged by the cam lifts on said body so as to reciprocate said rod upon rotation thereof, said cam lifts having a curvature predeterminedly equal to that of the curved outer surface of said work.

JOHN J. SEME.